US010462421B2

(12) United States Patent
Rintel et al.

(10) Patent No.: US 10,462,421 B2
(45) Date of Patent: Oct. 29, 2019

(54) PROJECTION UNIT

(71) Applicant: Microsoft Technology Licensing, LLC, Redmond, WA (US)

(72) Inventors: Edward Sean Lloyd Rintel, Cambridge (GB); Matthew Alastair Johnson, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/804,046

(22) Filed: Jul. 20, 2015

(65) Prior Publication Data

US 2017/0026612 A1    Jan. 26, 2017

(51) Int. Cl.
| | |
|---|---|
| *H04N 7/14* | (2006.01) |
| *H04N 13/25* | (2018.01) |
| *H04N 13/296* | (2018.01) |
| *G06F 3/01* | (2006.01) |
| *H04N 9/31* | (2006.01) |

(Continued)

(52) U.S. Cl.
CPC ............ *H04N 7/142* (2013.01); *G06F 3/012* (2013.01); *G06F 3/013* (2013.01); *G06K 9/00201* (2013.01); *G06K 9/00597* (2013.01); *H04N 5/2257* (2013.01); *H04N 7/147* (2013.01); *H04N 9/3173* (2013.01); *H04N 9/3194* (2013.01); *H04N 13/25* (2018.05); *H04N 13/296* (2018.05); *G06K 2209/40* (2013.01)

(58) Field of Classification Search
CPC combination set(s) only.
See application file for complete search history.

(56) References Cited

U.S. PATENT DOCUMENTS

| | | | |
|---|---|---|---|
| 8,320,971 B2 | 11/2012 | Roberts et al. | |
| 8,355,041 B2 | 1/2013 | Chen et al. | |

(Continued)

FOREIGN PATENT DOCUMENTS

| | | |
|---|---|---|
| CN | 101842810 A | 9/2010 |
| CN | 103037185 A | 4/2013 |

(Continued)

OTHER PUBLICATIONS

"V. 360 Capture Everything the Way You Play in Full 360°", May 18, 2015 Available at: http://www.vsnmobil.com/products/v360.

(Continued)

*Primary Examiner* — Phung-Hoang J Nguyen (57) ABSTRACT

A projection unit has a rotating capture module and a rotating projection module. The capture module has at least one color camera, at least one microphone and at least one depth camera and is configured to capture images of an environment. The rotating projection module is configured to project images onto at least one surface in the environment. The projection unit has a processor configured to use data captured by the rotating capture module to select the at least one surface in the environment, the selection being dependent on a field of view of at least one user in the environment and dependent on characteristics of surfaces in the environment. The processor is configured to control rotation of the rotating capture module such that the data captured by the rotating capture module is suitable for computing field of view the user, and for determining characteristics of the surfaces.

20 Claims, 10 Drawing Sheets

(51) Int. Cl.
*H04N 5/225* (2006.01)
*G06K 9/00* (2006.01)

(56) References Cited

U.S. PATENT DOCUMENTS

| | | | |
|---|---|---|---|
| 8,840,250 | B1 | 9/2014 | Yao et al. |
| 8,970,655 | B2 | 3/2015 | Paripally et al. |
| 8,994,776 | B2 | 3/2015 | Sutherland et al. |
| 9,024,997 | B2 | 5/2015 | Kumar et al. |
| 2002/0105623 | A1 | 8/2002 | Pinhanez |
| 2006/0167995 | A1* | 7/2006 | Rui ............... H04N 7/147 709/204 |
| 2007/0236671 | A1* | 10/2007 | Bitetto ........... G03B 21/006 353/122 |
| 2009/0059182 | A1 | 3/2009 | Ha et al. |
| 2010/0207874 | A1* | 8/2010 | Yuxin ............. G06F 3/017 345/156 |
| 2012/0194631 | A1 | 8/2012 | Venolia et al. |
| 2012/0249416 | A1* | 10/2012 | Maciocci ......... G06F 3/011 345/156 |
| 2013/0033426 | A1 | 2/2013 | Wang et al. |
| 2013/0290434 | A1* | 10/2013 | Bank ............. G06Q 10/10 709/206 |
| 2014/0168262 | A1* | 6/2014 | Forutanpour ..... G06T 19/006 345/633 |
| 2014/0218702 | A1* | 8/2014 | Yasui ............. G03B 21/28 353/99 |
| 2014/0245185 | A1 | 8/2014 | Knodt et al. |
| 2014/0267545 | A1 | 9/2014 | Paripally et al. |
| 2015/0102995 | A1 | 4/2015 | Shen et al. |
| 2015/0314454 | A1* | 11/2015 | Breazeal ......... B25J 9/0003 700/259 |

FOREIGN PATENT DOCUMENTS

| | | | |
|---|---|---|---|
| CN | 103226282 | A | 7/2013 |
| CN | 103460255 | A | 12/2013 |
| CN | 203734758 | U | 7/2014 |
| CN | 104185824 | A | 12/2014 |
| CN | 104410803 | A | 3/2015 |
| TW | 201520673 | A | 6/2015 |

OTHER PUBLICATIONS

Kim, et al., "TeleHuman: Effects of 3d Perspective on Gaze and Pose Estimation with a Life-Size Cylindrical Telepresence Pod", In Proceedings of SIGCHI Conference on Human Factors in Computing Systems, May 5, 2012, pp. 2531-2540.

"Black 360 Degree Vibration Resonance Mini Music Speaker for MP3 PC Phones Iphone IPad IPod With Remote + Free Excelvan Card Reader", May 18, 2015 Available at: https://www.cart2india.com/speakers/black-360-degree-vibration-resonance-mini-music-speaker-for-mp3-pc-phones-iphone-ipad-ipod-with-remote-free-excelvan-card-reader/00000000004300676318/.

"Introducing Mezzanine: The Future of Conference Room Collaboration", In White Paper, Jul. 2014, pp. 1-7.

"Amazon Echo", May 22, 2015, Available at: http://www.amazon.com/oc/echo.

"Projector Camcorders", May 22, 2015, Available at: http://www.bing.com/images/search?q=projector+camcorder&qp.

"Jibo", May 22, 2015, Available at: https://www.jibo.com/.

Tang, et al., "HomeProxy: Exploring a Physical Proxy for Video Communication in the Home", In Proceedings of SIGCHI Conference on Human Factors in Computing Systems, Apr. 27, 2013, pp. 1339-1342.

"International Search Report and Written Opinion Issued in PCT Application No. PCT/US2016/042372", dated Oct. 28, 2016, 15 Pages.

Pingali, et al., "User-Following Displays", In Proceedings of the IEEE International Conference on Multimedia and Expo, Aug. 26, 2016, pp. 845-848.

Tapia, et al., "Concept and Partial Prototype Video: Ubiquitous Video Communication with the Perception of Eye Contact", In Proceedings of the UBICOMP Video Program, Oct. 12, 2003, 2 Pages.

"Second Written Opinion Issued in PCT Application No. PCT/US2016/042372", dated Jun. 30, 2017, 10 Pages.

"International Preliminary Report on Patentability Issued in PCT Application No. PCT/US2016/042372", dated Oct. 5, 2017, 11 Pages.

"Office Action Issued in Chinese Patent Application No. 201680042709.5", dated Jan. 31, 2019, 13 Pages.

* cited by examiner

PROJECTION UNIT

BACKGROUND

Screen-based desktop videoconferencing, screen-based video presentations and screen-based digital television are now mature technologies, but the requirement for a screen is taxing in terms of space requirements, mobility, and cost. Using smart phones or tablet computers for mobile video conferencing allows for mobility but introduces the difficulty of holding a screen while moving, small image size and difficulty multi-tasking. More recently, augmented reality has become available as a way of presenting video or other image content. However, augmented reality headsets can be restrictive in some situations and can be difficult to use by novice users, or those with physical disabilities, the elderly and the very young. In the case of augmented reality video conferencing, augmented reality headsets impede the view of the face of both participants if both use headsets, or one participant if that person is not wearing a headset.

The embodiments described below are not limited to implementations which solve any or all of the disadvantages of known projection units.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A portable projection unit is described which has a rotating capture module and a rotating projection module. The capture module has at least one color camera, at least one microphone and at least one depth camera and is configured to capture images of an environment of the projection unit. The rotating projection module is configured to project images onto at least one surface in the environment. The projection unit has a processor configured to use data captured by the rotating capture module to select the at least one surface in the environment on which to project the images, the selection being dependent on a field of view of at least one user in the environment and dependent on characteristics of surfaces in the environment. The processor is configured to control rotation of the rotating capture module such that the data captured by the rotating capture module is suitable for computing field of view the user, and for determining characteristics of the surfaces. The processor is configured to control operation of the rotating projection module to project the images onto the at least one selected surface.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
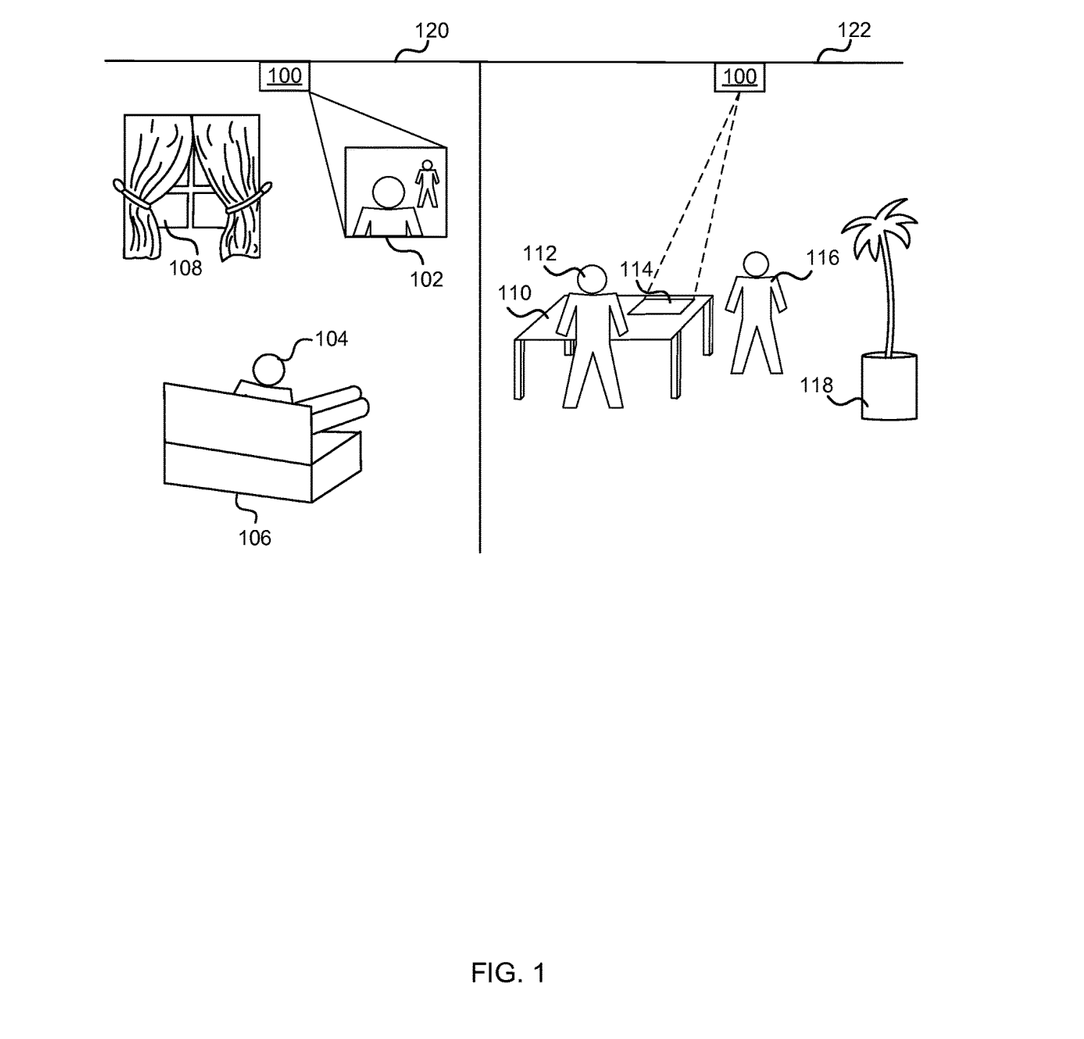
FIG. 1 is a schematic diagram of two rooms in different buildings, each room having a projection unit which projects images of a video call onto a surface in the respective room.

FIG. 1 is a schematic diagram of two rooms 120, 122 in different buildings, each room having a ceiling mounted projection unit 100 which projects images 102, 114 of a video call onto a surface in the respective room. For example, there is a video call ongoing between the projection units 100. In a first of the two rooms there is a person 104 on a sofa 106 and she has operated a natural user interface of the projection unit 100 in the first room, to establish a video call with the other projection unit in the second room 122. The rooms are in different buildings remote from one another. The natural user interface may comprise a voice operated user interface and/or a gesture based user interface for example.

The projection unit 100 in the first room 120 automatically detects the person on the sofa 106 by capturing images and/or sounds from the first room. It computes a field of view of the person, either using a cloud service, or using technology in the projection unit itself. The projection unit also computes (itself or using a cloud service) characteristics of surfaces in the first room from the captured images and/or sounds. The projection unit selects at least one surface in the room, on which to project images of the video call, the selection being dependent on a field of view of at least one user in the environment and dependent on characteristics of surfaces in the environment. A processor in the projection unit is configured to control rotation of a rotating capture module in the unit such that the data captured by the rotating capture module is suitable for computing field of view of the user, and for determining characteristics of the surfaces. The processor is also configured to control operation of a rotating projection module in the unit to project the images onto the at least one selected surface.

In the example of FIG. 1 the first room 120 has a window 108 and the projection unit 100 is able to detect the window and other surfaces in the room. It decides to project the video call image 102 onto the wall opposite the sofa as this is in the field of view of the user and has appropriate characteristics such as size, texture, reflectivity, illumination. In the second room 122 the ceiling mounted projection unit selects a table top 110 onto which the images of the video call are projected 114. The projection unit 100 is able to detect the table top and the field of view of two users 112, 116 which the unit 100 calculates are participating in the video call and who have a shared field of view encompassing the table top 110. The projection unit 100 is able to reconstruct surfaces in the room 122 such as of the floor, walls, house plant 118 and to select the table top 100 as having suitable characteristics such as size, texture, reflectivity, orientation with respect to the users, and also as being in the shared field of view of the two users. The projection unit is able to dynamically track field of view of users in the environment and to dynamically project the images 102, 114. That is, if the users move to new positions the projection unit is able to change the location of the projected images. In the example of FIG. 1 the projection unit 100 projects onto a single display region in the environment. However, it is also possible for a single projection unit to project images to a plurality of display regions in the environment at the same time.

Figure 2:
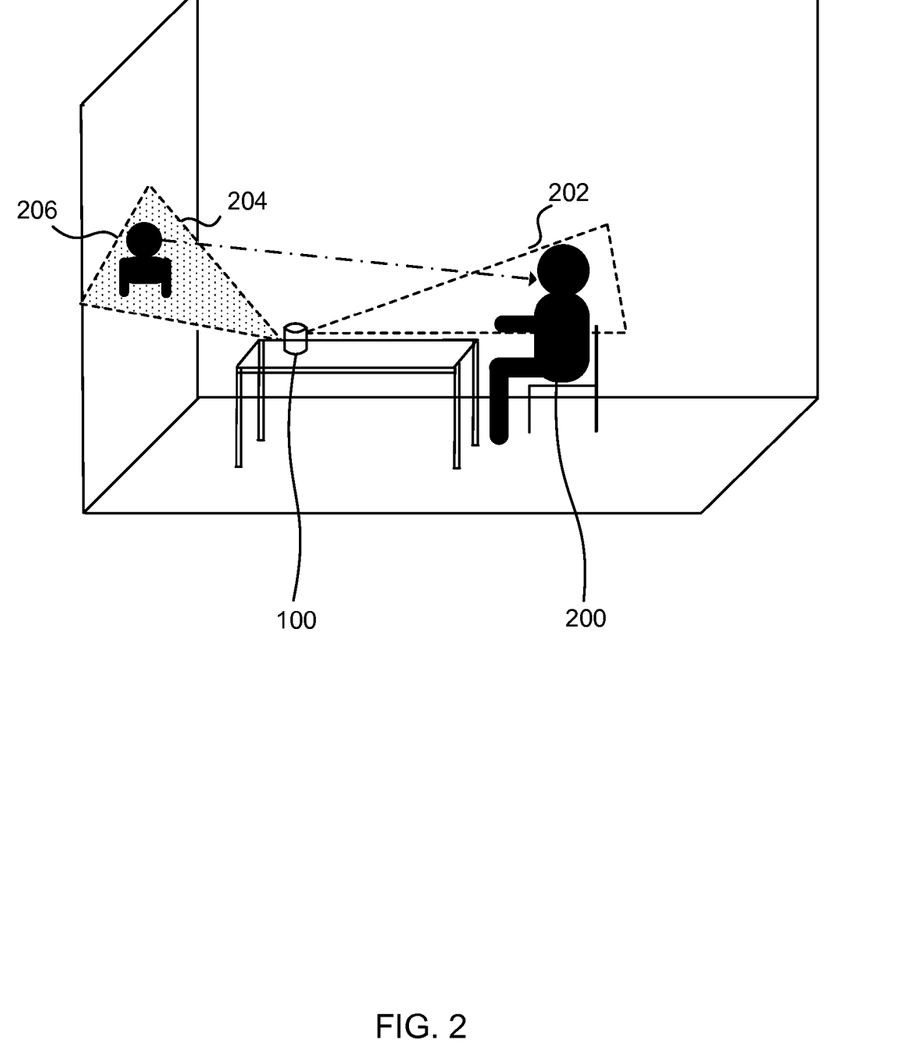
FIG. 2 is a schematic diagram of a room with a projection unit on a table at which a user is seated, and showing the projection unit projecting an image onto a wall of the room.

FIG. 2 is a schematic diagram of a room with a projection unit 100 on a table at which a user 200 is seated, and showing the projection unit projecting an image 204 onto a wall of the room. In this case the image is of a person 206 who is a remote party of a video call ongoing between the projection unit 100 and another communications device such as a smart phone, laptop computer, meeting room video conferencing equipment, tablet computer or other video conferencing device. The projection unit is capturing images of the seated user 200 as indicated by triangle 202 and transmitting the captured images to the remote party. In this way screen-less video conferencing is enabled in a simple manner without the need for augmented reality headsets. The size and shape of the projection unit and the ability to dynamically capture and dynamically project enable the user to operate the projection unit whilst he or she has naturalistic gaze. The user looks over the projection unit to see the images of the remote participant.

Figure 3:
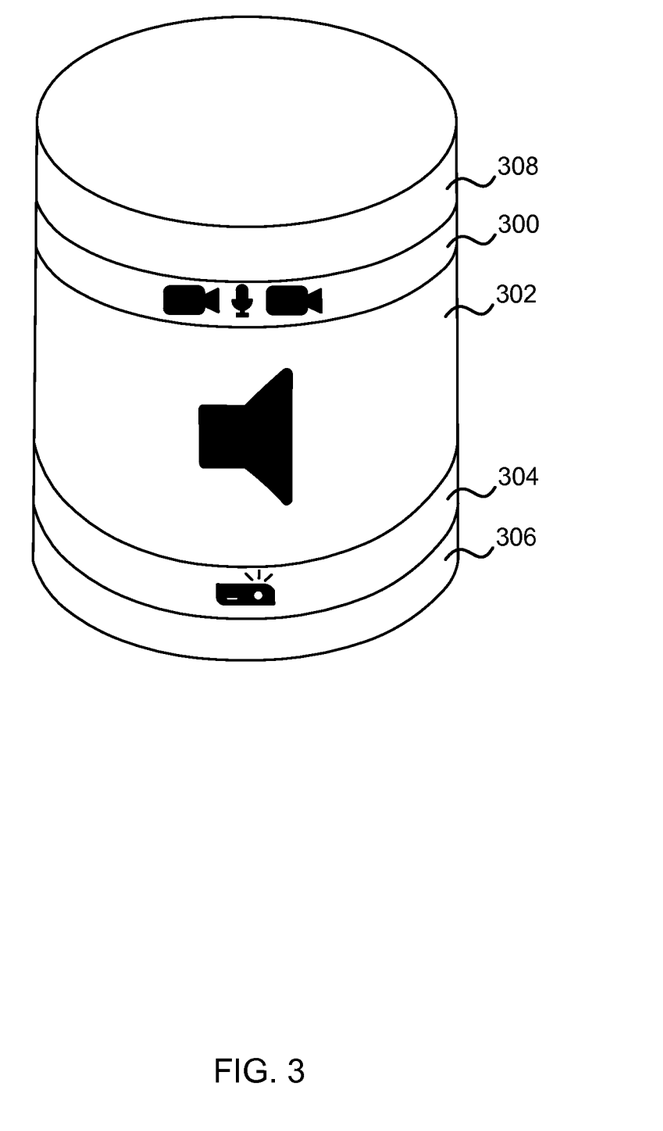
FIG. 3 is a perspective view an example projection unit.

FIG. 3 is a perspective view an example projection unit 100. The projection unit 100 is cylindrical and comprises a plurality of cylindrical modules 300, 302, 304, 306, 308 in a stacked arrangement. One or more of the cylindrical modules is rotatable about the axis of the cylinder and in some examples, at least two of the cylindrical modules are independently rotatable with respect to one another, about the axis of the cylinder. The projection unit has a flat base which can rest on a table top and, in some examples, is sized and shaped to be portable. The cylindrical design of FIG. 3 is an example only; other designs of projection unit can be used.

The projection unit 100 comprises a computing device 306 which is described in more detail below with respect to FIG. 10. The projection unit 100 also comprises a rotating projection module 304 comprising at least one pico projector and optionally comprising an optical arrangement comprising mirrors and/or lenses configured to optically move light projected by the pico projector. In some examples the rotating projection module 304 is rotating by virtue of the fact that the whole module rotates about its center. In some examples the rotating projection module has the property of rotating by virtue of the fact that the projected light it emits is rotatable with respect to the pico projector by using the optical arrangement. In some examples the rotating projection module rotates about its center and also has an optical arrangement for rotating the projected light with respect to the pico projector.

The projection unit 100 comprises one or more loudspeakers. In the example of FIG. 3 cylindrical component 302 is a 360° speaker section comprising one or more loudspeakers. In some examples the projection unit 100 has one or more loudspeakers where the direction of sound output can be controlled such that the sound appears to be originating from a specified location in the environment.

The projection unit 100 comprises a rotating capture module which may be housed in cylindrical component 300. The rotating capture module comprises at least one depth camera, at least one color camera, and at least one microphone. The rotating capture module is rotatable about its center. In the example of FIG. 3 it is rotatable about the axis of the cylinder. In some examples, the capture module also comprises (in addition to the capture module being physically rotatable) an optical arrangement of lenses and/or mirrors configured to alter the field of view of the capture module, for example, by rotating the field of view. The optical arrangement may be drivable to dynamically change the field of view of the capture module. For example, the field of view may be rotated to capture the gaze of a local user in such a manner that the local user appears to be looking at the projection unit, rather than over, under or beside the projection unit. This helps facilitate the perception of mutual direct gaze by both a local and a remote user. This is described in more detail below.

The projection unit 100 comprises a communications component which may be part of the computing device 306 or may be provided in a cylindrical component 308 of the stacked arrangement of FIG. 3. The communications component is configured to enable the projection unit to communicate with other entities over a communications network using wired and/or wireless communications.

Figure 4:
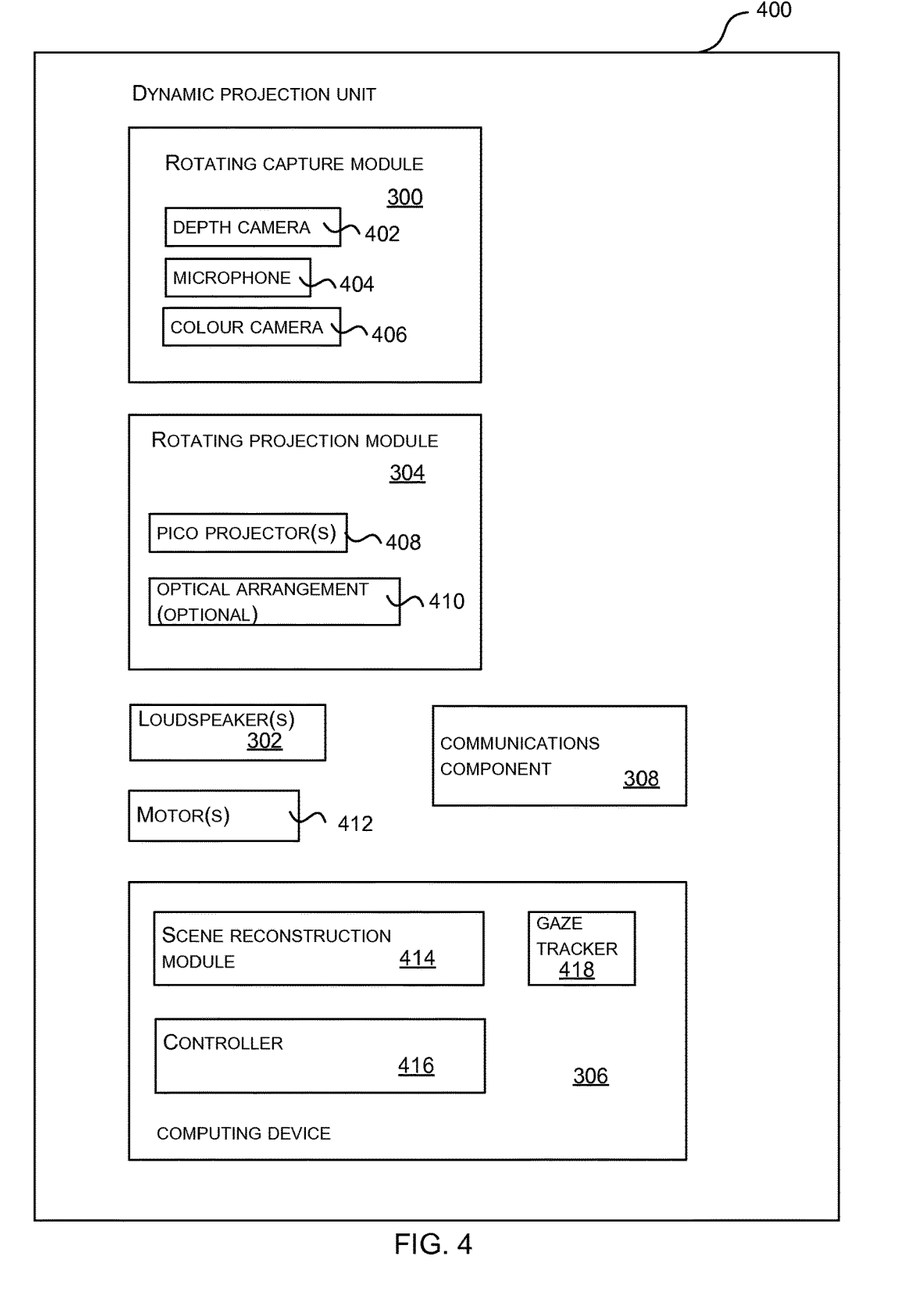
FIG. 4 is a schematic diagram of functional components of an example projection unit.

FIG. 4 is a schematic diagram of functional components of an example projection unit 400 such as the projection unit 100 of FIGS. 1 to 3. It comprises a rotating capture module 300 with at least one depth camera 402, at least one microphone 404 and at least one color camera 406. The cameras may capture sequences of images. There is a rotating projection module 304 comprising at least one pico projector 408 and optionally an optical arrangement 410 as described above. At least one loudspeaker 302 is present in the unit 400 and one or more motors 412 to drive the rotating capture module and, if appropriate, the rotating projection module. A communications component 308 is provided. The projection unit has a computing device 306 comprising a scene reconstruction module 414, a controller 416 and a gaze tracker 418.

The scene reconstruction module 414 comprises software and/or hardware which receives depth and/or color image data from the rotating capture module and computes characteristics of surfaces in the environment such as 3D position, size, texture, color, reflectivity, intensity, position with respect to other surfaces in the environment. For example it may compute a 3D reconstruction of surfaces in the environment by combining data from frames of depth image data in sequences of frames captured by the depth camera. The 3D reconstruction may comprise a truncated signed distance function or other representation of a surface. The 3D reconstruction holds information about 3D position of surfaces in the environment, relative sizes of the surfaces, and relative positions of the surfaces with respect to one another.

The scene reconstruction module may compute an indication of reflectivity of surfaces in the environment from the depth and/or color images. For example, by assessing the amount of multi path reflection observed in depth images captured by time of flight depth cameras, by assessing the amount of light returned to the depth and/or color cameras under active illumination by a light source (such as the pico projector) at the projection unit in conditions when the ambient illumination in the environment is low, by assessing intensity levels of the color images with respect to calibration color images captured under specified conditions or by using high level data such as a floor plan of the building.

The scene reconstruction module may compute an indication of texture of surfaces in the environment from the 3D reconstruction by assessing smoothness of surfaces in the 3D reconstruction. It may also use the color images to compute texture of the surfaces.

The scene reconstruction module may compute color and intensity of surfaces in the environment from the color images.

The gaze tracker 418 may comprise body part or skeletal tracking technology such as increasingly used with depth cameras and/or color cameras. The gaze tracker detects the 3D pose of a user's head using the body part or skeletal tracking technology, where the 3D pose is a six degree of freedom parameter indicating 3D position and orientation. From the 3D head pose the gaze tracker computes gaze direction of the user and field of view of the user. In some examples the field of view takes into account scene reconstruction data, so that if a user's field of view is partially blocked by an object in the environment, the field of view is restricted.

The computing device 306 also comprises a controller 416 comprising control functionality for operating the capture module 300, projection module 304, loudspeakers 302 and motors. The control module may operate a control process as described below with respect to FIG. 7.

The functionality of one or more of the components of FIG. 4 described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 5:
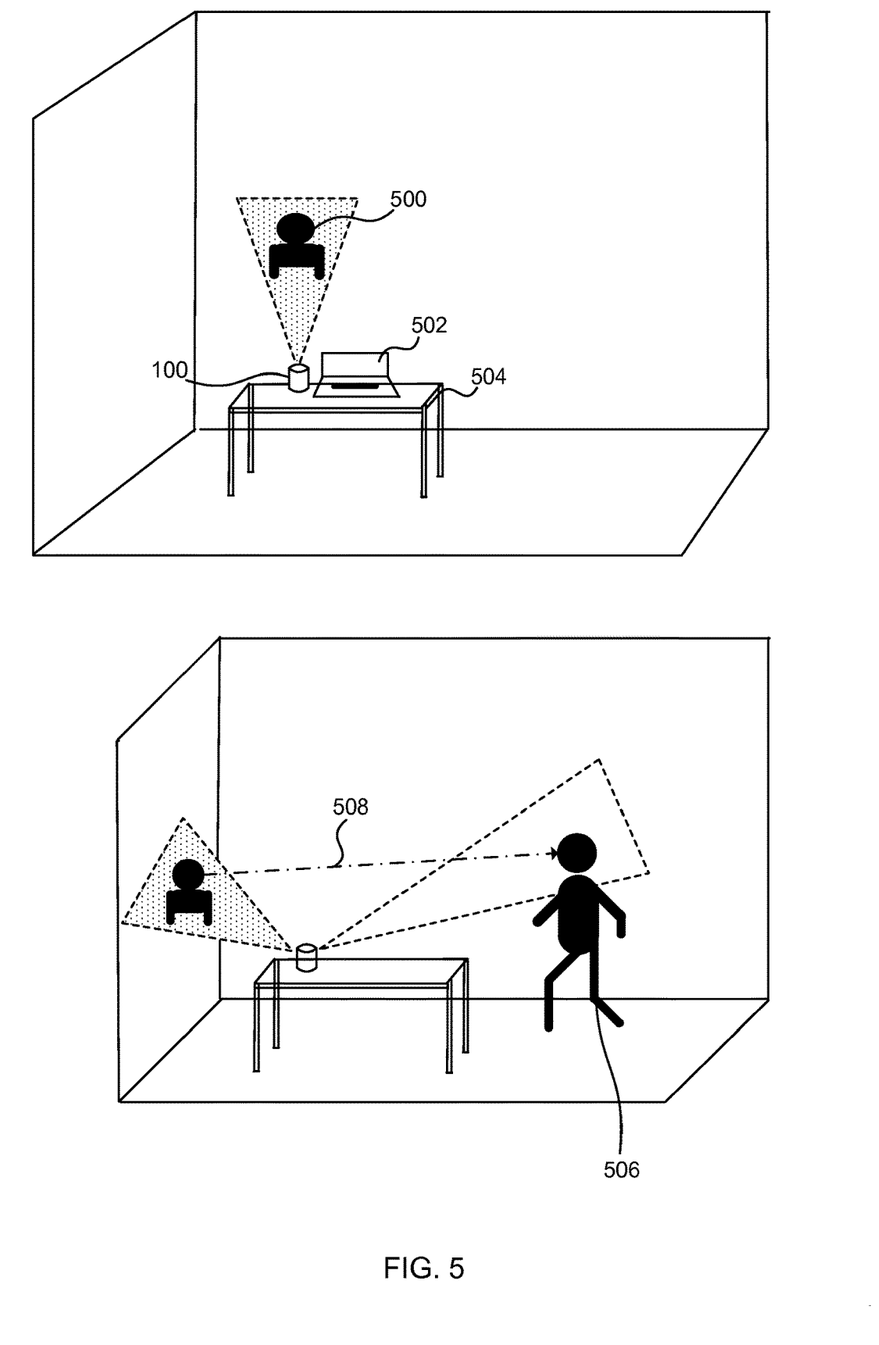
FIG. 5 is a schematic diagram of a scenario with a laptop computer and a projection unit on a table, and of another scenario with a person walking towards a projection unit on a table.

FIG. 5 is a schematic diagram of a scenario (upper part of FIG. 5) with a laptop computer 502 and a projection unit 100 on a table 504, and of another scenario (lower part of FIG. 5) with a person 506 walking towards a projection unit on a table. In the scenario with the laptop computer 502 it can be seen that the projection unit 100 is sized and shaped to be smaller than a laptop computer in an open configuration. In this example, the projection unit is sized and shaped such that when the projection unit is supported on a table, a user sitting at the table is able to look over the top of the unit, for example, to see a projection of a remote video call participant projected onto a wall.

In the lower part of FIG. 5 a person 506 is walking towards the projection unit which is on a table. The gaze direction of the user 506 is indicated by line 508 and this may be computed by the gaze tracker 418. The field of view of the user 506 is centered on the gaze direction 506 and includes a wall of the room onto which the projection unit projects images of a remote participant to a video call. As the user 506 moves in the room the projection unit dynamically tracks the gaze direction and field of view and dynamically updates the location of the projected image accordingly.

Figure 6:
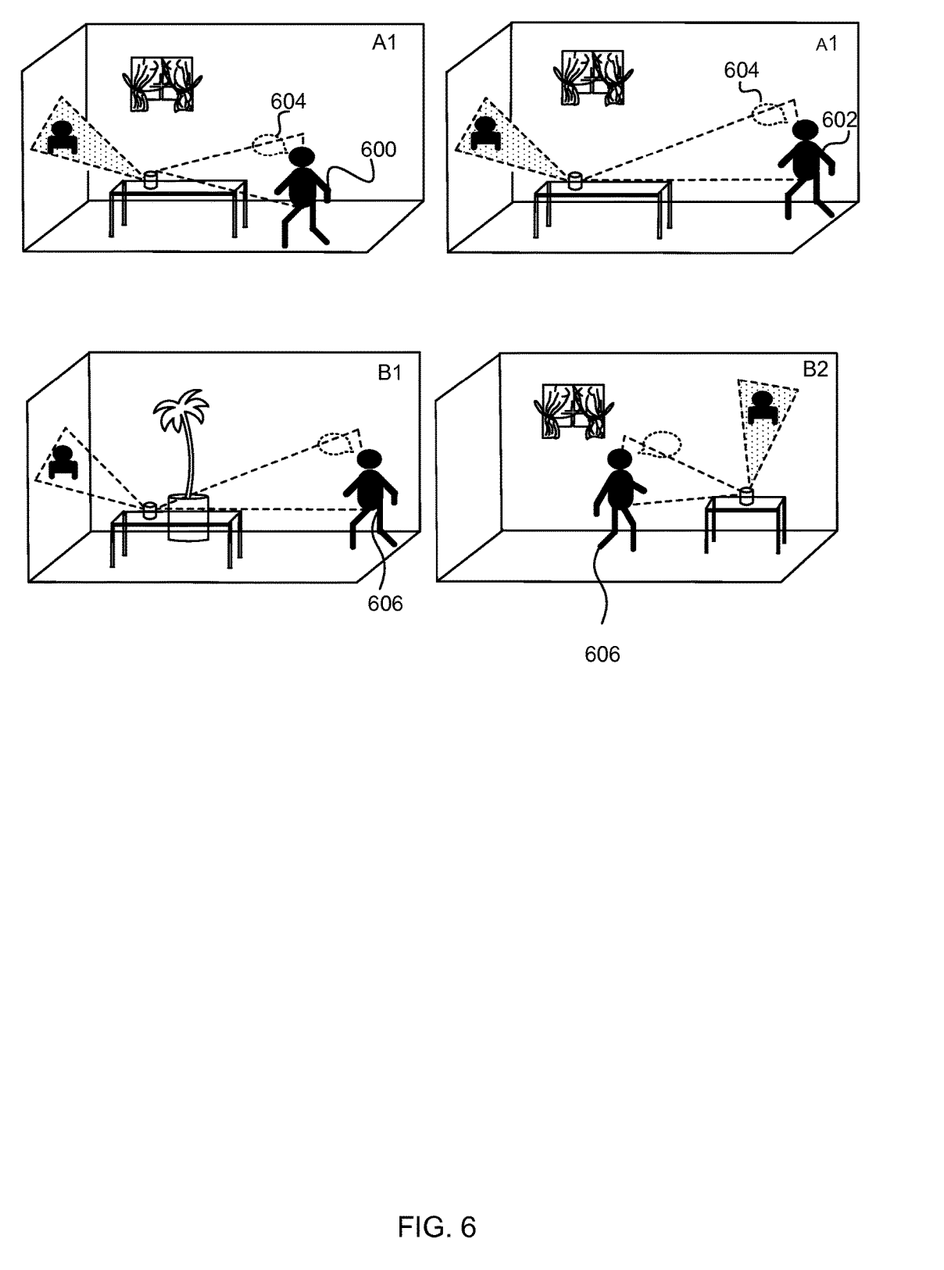
FIG. 6 is a schematic diagram of a scenario in which a user moves with respect to a projection unit, and of a scenario in which a user walks from one room into another room, both rooms having a projection unit.

FIG. 6 is a schematic diagram of a scenario (upper part of FIG. 6) in which a user moves with respect to a projection unit, and of a scenario (lower part of FIG. 6) in which a user walks from one room into another room, both rooms having a projection unit. In the upper part of FIG. 6 user 600 is at first close to a table with the projection unit in room A1. The user speaks (indicated by dotted speech bubble 604) and the sound is captured by a microphone at the projection unit. Images of the user are captured by the projection unit. The captured images and sound are transmitted as part of a video call to a remote party. The projection unit projects an image of the remote party onto the wall. As the user moves to a location 602 away from the unit towards a doorway (not shown) the projection unit detects that the user is likely to leave the room A1. For example, the user may speak the words "follow me" or other similar command. The projection unit communicates wirelessly with other projection units in the building by sending a message alerting them that a projection hand over process may be required.

In the scenario of the lower part of FIG. 6 a user 606 is in a first room B1. A video call is ongoing as described above. The user speaks the words "follow me" or other similar command and exits the room B1. (Speaking a command is optional.) The projection unit sends a message comprising details of the video call being presented to other projection units in the building/vicinity. The user enters room B2 which also has a projection unit. In room B1 the projection unit is expecting a user 606 since it has received the message from the projection unit of room B1. It tracks the gaze of the user 606, selects a suitable surface in the environment, obtains the images using the details in the received message, and projects the video call image and sound.

Figure 7:
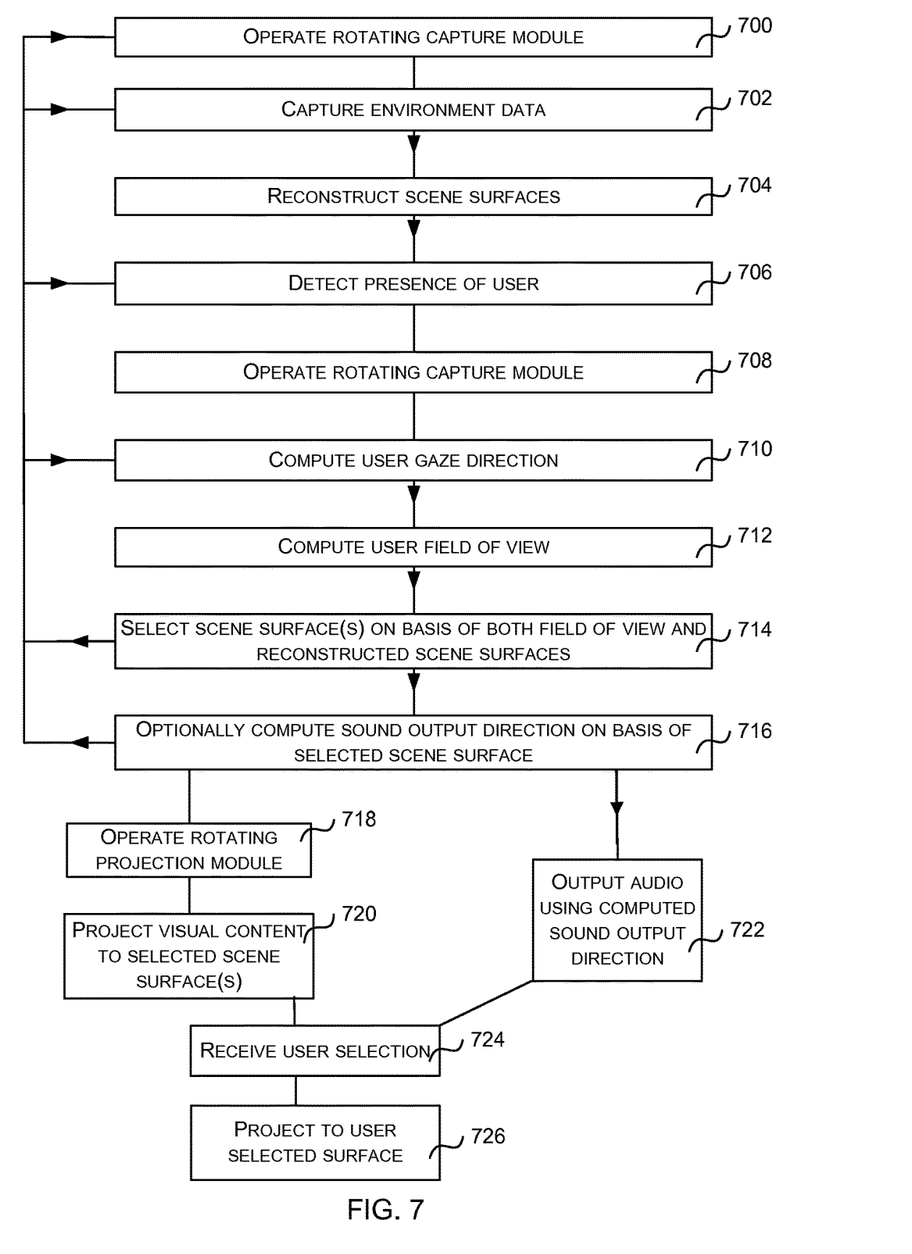
FIG. 7 is a flow diagram of an example method at a projection unit.

FIG. 7 is a flow diagram of an example method at a projection unit. The method of FIG. 7 may be implemented at the controller 416 of FIG. 4.

When a projection unit is initialized, for example, by being placed on a surface, mounted on a ceiling or wall, mounted on a pole or other support, the projection unit operates the rotating capture module 700 to capture environment data 702 such as sequences of depth images, sequences of color images, sound and other data. The controller 416 triggers the scene reconstruction module 414 to reconstruct scene surfaces 704 using the captured environment data and to compute characteristics of surfaces in the scene as described above.

The controller monitors for the presence of a user in the environment. For example, it monitors sounds and images captured by the rotating capture module 700. When the presence of a user is detected 706 the controller causes operation of the rotating capture module 708 to capture images of the user's head from one or more camera positions. The controller triggers operation of the gaze tracker 418 which computes gaze direction 710 of the user as described above, and computes field of view of the user 712. The captured images of the user may be transmitted as part of a video call for example, to another entity, using the communications component. In some examples, the capture module comprises an optical arrangement which is dynamically driven to alter the field of view of the projection unit in dependence on a gaze direction of the user. For example so that the gaze direction of the user moves towards the center of the field of view of the projection unit. In this manner, the captured images depict the local user as if he or she were looking more directly at the projection unit, rather than to another point in the scene such as a location above, below or beside the projection unit.

The controller selects one or more scene surfaces in dependence on both the field of view of the user and the characteristics of the scene surfaces. At least some of the characteristics of the scene surfaces may be computed from the surface reconstruction. Optionally the controller computes 716 a sound output direction in dependence on one of the selected scene surfaces.

The controller triggers operation of the rotating projection module 718 to project visual content onto one or more of the selected surfaces 720. For example, it may project images onto two different surfaces and request user input regarding which surface is preferred by the user. The controller receives user selection data 724 and causes the rotating projection module to project to the user selected surface 726. In the case that sound output direction is computed 716 the controller triggers the loudspeaker(s) to output audio 722 using the computed sound direction.

The projected images may comprise images of a remote user who is participating in a video call with a user local to the projection unit. In some examples, where an optical arrangement in the projection module is available, the optical arrangement is used together with an optical arrangement in the capture module. For example, in order to adjust an apparent gaze of the remote user depicted in the images, as being towards the local user of the projection unit. This helps facilitate the perception of mutual direct gaze between a local and a remote user.

Figure 8:
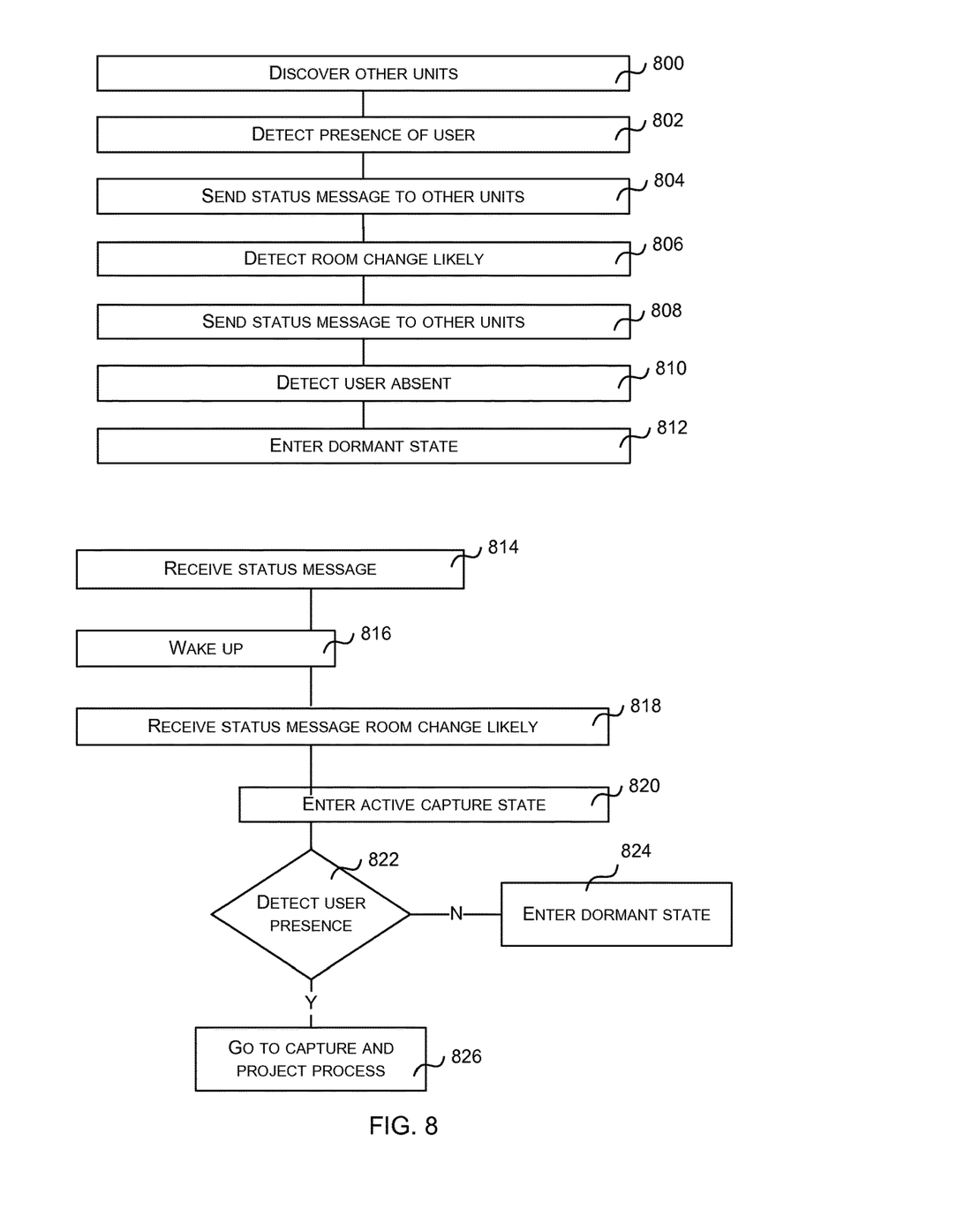
FIG. 8 is a flow diagram of a method at a projection unit in a first room and a method at a projection unit in a second room.

FIG. 8 is a flow diagram of a method at a projection unit in a first room and a method at a projection unit in a second room, for example, where a user travels from the first room to the second room and projection of content is transferred between projection units in the two rooms.

A projection unit in a first room of a building discovers 800 other projection units in the vicinity/building using a wireless discovery process, using pre-configured data, using a cloud service or in other ways. The projection unit detects 802 the presence of a user in the first room and sends 804 a status message to the other projection units that it has discovered. The status message may be broadcast wirelessly in the building or may be sent to specified ones of the discovered projection units. The status message comprises at least an indication that a user has been detected.

The projection unit monitors for a situation where the user is likely to be leaving the room. For example, by checking for location of the user near a doorway, by receiving a voice command from the user or in other ways. When a likely room change is detected 806 the projection unit sends a second status message to one or more of the other units. The second status message may be broadcast wirelessly in the building or may be sent to specified ones of the discovered projection units. The second status message comprises at least an indication that a room change is likely and details of any content currently being projected.

The projection unit monitors for a situation where the user is absent 810 for example by checking no user image data is present in captured images. If so, it enters a dormant state 812 in which power is conserved.

A projection unit in a second room of the building receives the first status message 814 sent from the first room. The controller triggers wake up 816 of the projection unit in the case that the projection unit was in a dormant state. In the waking state the projection unit has full power available.

The projection unit in the second room receives a second status update message 818 indicating that a room change is likely. It enters an active capture state 820 in which it captures images of any doorways in the room to detect entrance of a user. It monitors the images and/or monitors sound to check 822 for user presence. If no user is detected after a specified period of time the projection unit enters a dormant state 824. If a user is detected the projection unit moves to a capture and project process 826 such as that described with respect to at least part of FIG. 7.

Figure 9:
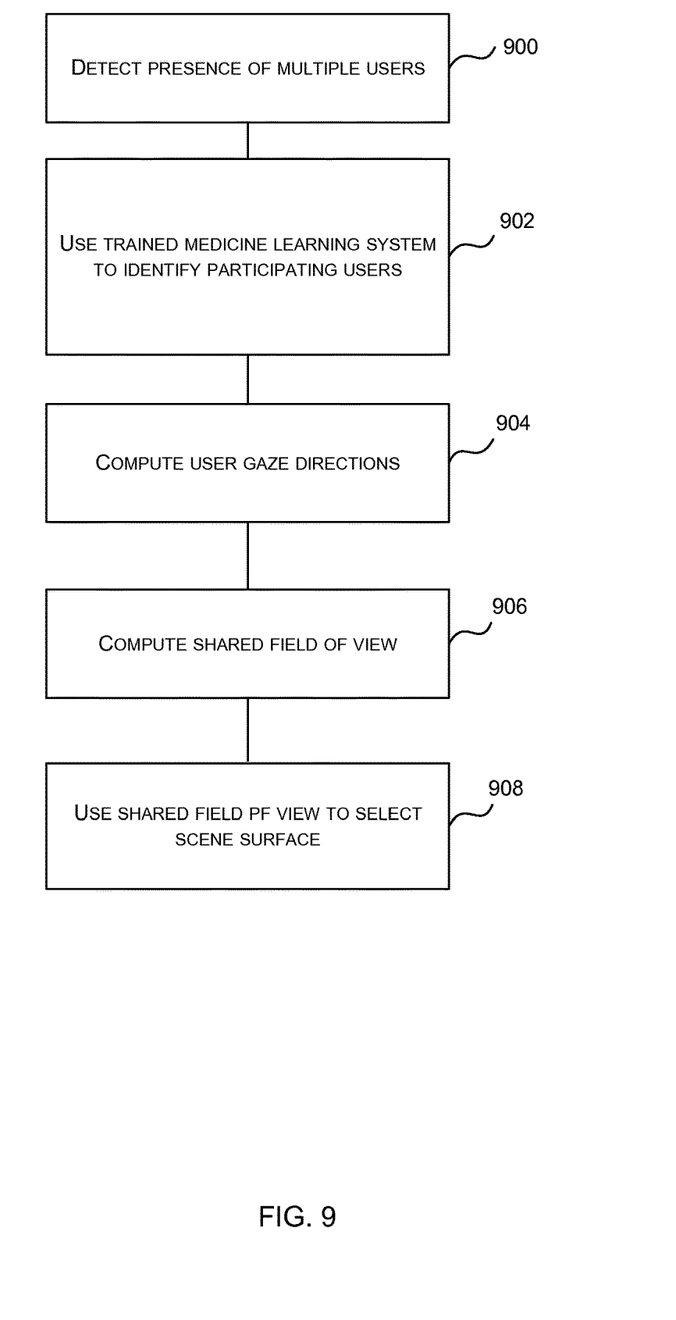
FIG. 9 is a flow diagram of a method at a projection unit in which multiple users are detected.

In some examples the projection unit is configured to deal with multi-user scenarios. If the projection unit detects 900 the presence of more than one user in its environment whilst it is projecting content, for example, through image analysis and/or sound analysis, it uses a trained machine learning system to identify participating 902 users. Participating users are those who are involved in consuming the content projected by the projection unit at the same, single, projection location. The projection unit may use a cloud service having the trained machine learning system or it may have a suitable trained machine learning system stored in the projection unit or local to the projection unit.

The trained machine learning system comprises a classifier such as a random decision forest, support vector machine, neural network or other type of classifier. The trained machine learning system is trained using labeled training data comprising images and/or sound data of multiple users, details of projection surfaces used when the images and/or sound were captured, and where the users are labeled as participating in the projected content at a specified surface, or not participating in the projected content at the specified surface.

The projection unit computes 904 a gaze direction for each user identified as participating in consuming the projected content. The gaze tracker component may be used for this. The projection unit computes a shared 906 field of view of the participating users and selects 908 a surface in the scene for projecting the content onto, on the basis of both the shared field of view and characteristics of scene surfaces.

Figure 10:
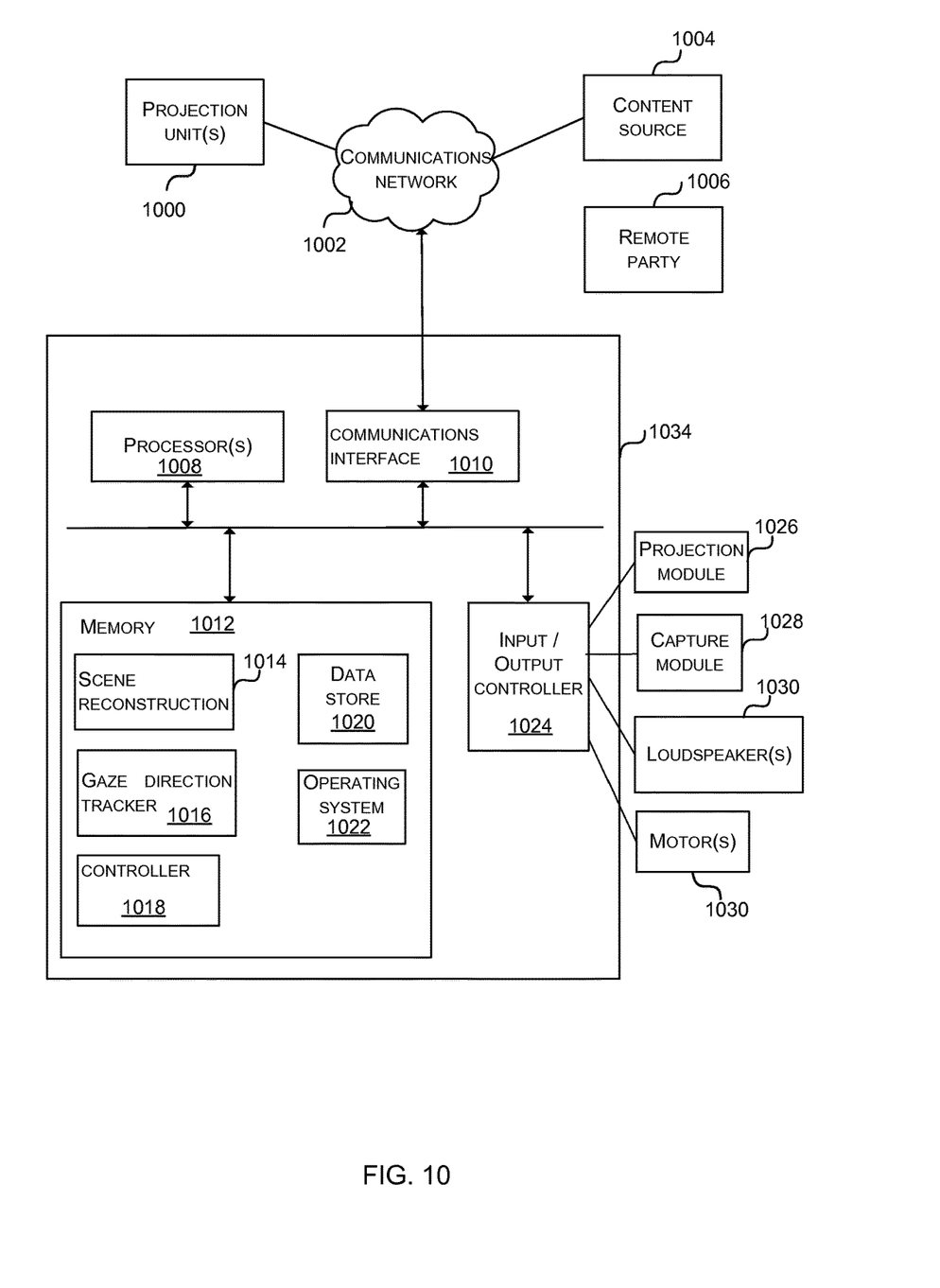
FIG. 10 illustrates an exemplary computing-based device as part of a projection unit.

FIG. 10 illustrates various components of an exemplary computing-based device 1034 of the projection unit of FIG. 4.

Computing-based device 1034 comprises one or more processors 1008 which may be microprocessors, controllers or any other suitable type of processors for processing computer executable instructions to control the operation of the device in order to control operation of a projection unit for dynamic tracking of users and dynamic projection of content onto scene surfaces. In some examples, for example where a system on a chip architecture is used, the processors 1008 may include one or more fixed function blocks (also referred to as accelerators) which implement a part of the method of controlling a projection unit in hardware (rather than software or firmware). Platform software comprising an operating system 1022 or any other suitable platform software may be provided at the computing-based device to enable application software to be executed on the device.

The computing-based device comprises at least a scene reconstruction component 1014, a gaze direction tracker 1016 and a controller 1018. A data store 1020 holds data such as images, sound recordings, scene reconstructions, characteristics of surfaces, gaze direction, field of view data, locations of doorways, status messages and other data. The computing-based device 1034 may be in communication with one or more content sources 1004 via a communications network 1002 using a communications interface 1010. One or more other projection units 1000 may be present on the communications network 1002 as well a one or more remote parties 1006 such as remote video call parties.

The computer executable instructions may be provided using any computer-readable media that is accessible by computing based device 1034. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1012) is shown within the computing-based device 1034 it will be appreciated that the storage may be distributed or located remotely and accessed via a network or other communication link (e.g. using communications interface 1010).

The computing-based device 1034 also comprises an input/output controller 1024 arranged to output display information to a projection module 1026. The display information may provide a graphical user interface. The input/output controller 1024 is also arranged to receive and process input from one or more devices, such as capture module 1028, loudspeakers 1030. The input/output controller 1024 also sends and receives messages with the motor(s) 1032 of the projection unit.

The computing-based device 1034 comprises NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, gesture recognition, head and eye tracking, voice and speech, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, head, eye and gaze tracking, and technologies for sensing brain activity using electric field sensing electrodes (EEG and related methods).

In various examples there is a portable projection unit comprising:
a rotating capture module comprising: at least one color camera, at least one microphone, at least one depth camera, the rotating capture module configured to capture images of the environment;
a rotating projection module configured to project images onto at least one surface in the environment; and
a processor configured to use data captured by the rotating capture module to select the at least one surface in the environment on which to project the images, the selection being dependent on a field of view of at least one user in the environment and dependent on characteristics of surfaces in the environment; the processor configured to control rotation of the rotating capture module such that the data captured by the rotating capture module is suitable for computing field of view of the user, and for determining characteristics of the surfaces, and the processor configured to control operation of the rotating projection module to project the images onto the at least one selected surface.

For example, the characteristics of surfaces in the environment comprise one or more of: 3D position, size, texture, color, reflectivity, intensity, position with respect to other surfaces in the environment.

For example, the processor is configured to reconstruct surfaces in the environment using the data captured by the rotating capture module and to compute characteristics of surfaces in the environment at least from the reconstruction.

For example, the rotating capture module is independently rotatable with respect to the rotating projection module.

In an example the projection unit has at least one loudspeaker and is configured to control the loudspeaker to use a sound output direction computed in dependence on the selected surface.

The projection unit may be sized and shaped such that when the projection unit is supported on a table, a user sitting at the table is able to look over the top of the unit.

In some examples the unit is portable or ceiling mountable.

The projection unit may have a communications component configured to communicate with one or more other projection units in different rooms of the environment, the communications component arranged to send a message to the other projection units in the case that the projection unit detects the presence of a user in the environment, or in the case that the projection unit detects a user in the environment who is likely to leave the environment, the message comprising details of the projected images.

For example the details of the projected images comprise a source of the projected images.

The projection unit may have a communications component configured to communicate with one or more other projection units in different rooms of the environment, the processor arranged to wake up the projection unit, or to control the rotatable capture module to enter an active capture state, in dependence on a message received from one of the other projection units.

In some examples the processor is configured to use data captured by the rotating capture module to detect presence of multiple users in the environment, and to select the at least one surface in dependence on a shared field of view of the users.

In some examples the processor is configured to identify ones of the multiple users who are participating in viewing the projected images and ones of the multiple users who are not participating in viewing the projected images, and to compute the shared field of view from data about the users identified as participating in viewing the projected images.

In some examples the processor is configured to select a plurality of surfaces in the environment and to enable a user to select one of the plurality of surfaces.

In some examples the processor is configured to record data associated with the user selection and to monitor for situations where the recorded data occurs again.

The projection unit may comprise a communications component arranged to establish a video call with a communications device, and wherein the projected images comprise images of the video call.

In some examples the rotating projection module comprises an optical arrangement.

In some examples the capture module comprises an optical arrangement configured to adjust the field of view of the capture module in dependence on a gaze direction of the at least one user.

In examples there is a distributed projection system comprising a plurality of projection units, individual ones of the projection units being situated in different rooms of a building, each of the projection units comprising:

a rotating capture module comprising: at least one color camera, at least one microphone, at least one depth camera, the rotating capture module configured to capture images of the environment;

a rotating projection module configured to project images onto at least one surface in the environment; and a processor configured to use data captured by the rotating capture module to select the at least one surface in the environment on which to project the images, the selection being dependent on a field of view of at least one user in the environment and dependent on characteristics of surfaces in the environment; the processor configured to control rotation of the rotating capture module such that the data captured by the rotating capture module is suitable for detecting gaze of the user, and for determining characteristics of the surfaces, and the processor configured to control rotation of the projection module to project the images onto the at least one selected surface.

In an example there is a method comprising:

receiving depth images, color images and sound captured from an environment by rotating a capture module of a projection unit in the environment;

using data captured by the capture module to automatically select at least one surface in the environment on which to project images; and controlling a rotating projection module which is part of the projection unit, to project the images onto the at least one surface;

wherein automatically selecting the at least one surface is dependent on a field of view of at least one user in the environment and dependent on characteristics of surfaces in the environment, the field of view and the characteristics being computed from the received depth images and the received color images.

The method may comprise operating a communications component of the projection unit to communicate with one or more other projection units in different rooms of the environment, the communications component arranged to send a message to the other projection units in the case that the projection unit detects the presence of a user in the environment, or in the case that the projection unit detects a user in the environment who is likely to leave the environment, the message comprising details of the projected images.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A portable projection unit comprising:
   a rotating capture module comprising: at least one color camera, at least one microphone, and at least one depth camera, the rotating capture module configured to capture images of the environment;
   a rotating projection module configured to project images onto at least one surface of a plurality of surfaces in the environment; and
   a processor configured to:
      identify a plurality of users physically in the environment;
      identify a first set of users from the plurality of users physically in the environment as participants and a second set of users from the plurality of users physically in the environment as non-participants;
      use data captured by the rotating capture module to select a surface from the plurality of surfaces in the environment on which to project the images, the selection being based on a current shared field of view of the first set of the plurality of users in the environment and not the second set of the plurality of users and on characteristics of the plurality of surfaces in the environment;
      control rotation of the rotating capture module such that the data captured by the rotating capture module is suitable for computing the current shared field of view of the first set of the plurality of users and for determining characteristics of the plurality of surfaces; and
      control operation of the rotating projection module to project the images onto the selected surface.

2. The projection unit of claim 1 wherein the characteristics of the plurality of surfaces in the environment comprise one or more of the following: 3D position, size, texture, color, reflectivity, intensity, and position with respect to other surfaces in the environment.

3. The projection unit of claim 1 wherein the processor is configured to:
   reconstruct surfaces in the environment using the data captured by the rotating capture module; and
   compute characteristics of surfaces in the environment at least from the reconstruction.

4. The projection unit of claim 1 wherein the rotating capture module is independently rotatable with respect to the rotating projection module.

5. The projection unit of claim 1 comprising at least one loudspeaker and wherein the processor is configured to control the loudspeaker to use a sound output direction computed in dependence on the selected surface.

6. The projection unit of claim 1 wherein the current shared field of view of the first set of the plurality of users is based on a gaze of the first set of the plurality of users.

7. The projection unit of claim 1 wherein the unit is portable or ceiling mountable.

8. The projection unit of claim 1 comprising a communications component configured to communicate with one or more other projection units in different rooms of the environment, the communications component arranged to send a message to the other projection units in a case that the projection unit detects a presence of the user in the environment, or in a case that the projection unit detects that the user in the environment is likely to leave the environment, the message comprising details of the projected images.

9. The projection unit of claim 8 wherein the details of the projected images comprise a source of the projected images.

10. The projection unit of claim 1 comprising a communications component configured to communicate with one or more other projection units in different rooms of the environment, the processor arranged to wake up the projection unit, or to control the rotatable capture module to enter an active capture state, in dependence on a message received from one of the other projection units.

11. The projection unit of claim 1 wherein the processor is configured to:
   use data captured by the rotating capture module to detect a presence of multiple users in the environment.

12. The projection unit of claim 1 wherein the processor is configured to:
   identify the first set of users as participants based on one or more of the following: image analysis and sound analysis.

13. The projection unit of claim 1 wherein the processor is configured to:
   enable a user to select one of the plurality of surfaces.

14. The projection unit of claim 13 wherein the processor is configured to:
   record data associated with the user selection; and
   monitor for situations where the recorded data occurs again.

15. The projection unit of claim 1 further comprising a communications component arranged to establish a video call with a communications device, and wherein the projected images comprise images of the video call.

16. The projection unit of claim 1 wherein the capture module comprises an optical arrangement configured to adjust a field of view of the capture module in dependence on a gaze of the first set of the plurality of users with respect to a location of the projection unit.

17. A distributed projection system comprising a plurality of projection units, individual ones of the projection units being situated in different rooms of a building, each of the projection units comprising:
   a rotating capture module configured to capture images of the environment, the rotating capture module comprising:
      at least one color camera,
      at least one microphone,
      at least one depth camera;
   a rotating projection module configured to project images onto at least one surface from a plurality of surfaces in the environment; and
   a processor configured to:
      identify a plurality of users physically in the environment;
      identify a first set of users from the plurality of users physically in the environment as participants and a second set of users from the plurality of users physically in the environment as non-participants;

use data captured by the rotating capture module to select a surface from the plurality of surfaces in the environment on which to project the images, the selection being based on a current shared field of view of the first set of the plurality of users in the environment and not the second set of the plurality of users and on characteristics of the plurality of surfaces in the environment;

control rotation of the rotating capture module such that the data captured by the rotating capture module is suitable for detecting the current shared field of view of the first set of the plurality of users, and for determining characteristics of the plurality of surfaces; and control rotation of the projection module to project the images onto the selected surface.

18. A method comprising:

receiving depth images, color images, and sound captured from an environment by rotating a capture module of a projection unit in the environment;

identifying a plurality of users physically in the environment;

identifying a first set of users from the plurality of users physically in the environment as participants and a second set of users from the plurality of users physically in the environment as non-participants;

using data captured by the capture module to automatically select a surface form a plurality of surfaces in the environment on which to project images; and controlling a rotating projection module, which is part of the projection unit, to project the images onto the selected surface;

wherein automatically selecting the surface is based on a current shared field of view of the first set of the plurality of users in the environment and not the second set of the plurality of users and based on characteristics of the plurality of surfaces in the environment, the current shared field of view and the characteristics being computed from the received depth images and the received color images.

19. The method of claim 18 further comprising operating a communications component of the projection unit to communicate with one or more other projection units in different rooms of the environment, the communications component arranged to send a message to the other projection units in a case that the projection unit detects a presence of the user in the environment, or in case that the projection unit detects the user in the environment is likely to leave the environment, the message comprising details of the projected images.

20. The portable projection unit of claim 1, wherein the processor is further programmed to:

determine that the current shared field of view of the first set of the plurality of users has changed;

use new data captured by the rotating capture module to select a second surface from the plurality of surfaces in the environment on which to project second images, the selection being based on a new shared field of view of the first set of the plurality of users in the environment and on the characteristics of the plurality of surfaces in the environment;

control rotation of the rotating capture module such that the new data captured by the rotating capture module is suitable for computing the new shared field of view of the first set of the plurality of users; and control operation of the rotating projection module to project the second images onto the second selected surface.

* * * * *